(12) United States Patent
Jha

(10) Patent No.: US 7,685,094 B2
(45) Date of Patent: Mar. 23, 2010

(54) COMMON SCHEMA FOR AGGREGATING INFORMATION EXCHANGE REQUIREMENTS

(75) Inventor: Uma S. Jha, Placentia, CA (US)

(73) Assignee: The Boeing Company, Chicago, IL (US)

( * ) Notice: Subject to any disclaimer, the term of this patent is extended or adjusted under 35 U.S.C. 154(b) by 328 days.

(21) Appl. No.: 11/771,901

(22) Filed: Jun. 29, 2007

(65) Prior Publication Data

US 2008/0010305 A1    Jan. 10, 2008

Related U.S. Application Data

(63) Continuation of application No. 10/746,100, filed on Dec. 23, 2003, now Pat. No. 7,254,567.

(60) Provisional application No. 60/528,686, filed on Dec. 10, 2003.

(51) Int. Cl.
*G06F 7/00* (2006.01)
(52) U.S. Cl. .............................. 707/1; 707/3
(58) Field of Classification Search ............... 707/1–10, 707/200–203
See application file for complete search history.

(56) References Cited

U.S. PATENT DOCUMENTS

| | | | |
|---|---|---|---|
| 6,108,346 A | 8/2000 | Doucette et al. | |
| 6,205,478 B1 | 3/2001 | Sugano et al. | |
| 6,374,263 B1 | 4/2002 | Bunger et al. | |
| 6,393,423 B1 | 5/2002 | Goedken | |
| 6,539,403 B2 | 3/2003 | Cho et al. | |
| 6,601,043 B1 | 7/2003 | Purcell | |
| 6,601,111 B1 | 7/2003 | Peacock et al. | |
| 2001/0038632 A1 | 11/2001 | Matsumoto et al. | |
| 2002/0035556 A1 | 3/2002 | Shah et al. | |
| 2003/0140097 A1* | 7/2003 | Schloer | 709/203 |
| 2003/0208473 A1* | 11/2003 | Lennon | 707/3 |
| 2003/0229677 A1* | 12/2003 | Allan | 709/217 |
| 2004/0174822 A1* | 9/2004 | Bui | 370/252 |
| 2004/0252821 A1* | 12/2004 | Chiczewski et al. | 379/207.11 |

OTHER PUBLICATIONS

Mark T. Elmore et al., Dynamic Data Fusion Using An Ontology-Based Software Agent System, 7th World Multiconferenee on Systemics, Cybernetics and Informatics Proceedings, Jul. 27, 2003, pp. 1-6.

Bob Miller et al., Transforming Tactical Messaging: Exploiting Web Information Standards for Interoperability, The Mitre Corp., Hampton, VA, Feb. 7, 2003, pp. 1-10.

* cited by examiner

*Primary Examiner*—Wilson Lee
(74) *Attorney, Agent, or Firm*—Yee & Associates, P.C.; John A. LePore

(57) ABSTRACT

A new approach to aggregating a plurality of information exchange requirements (IERs) into a common schema is disclosed. A device has a digital storage medium that includes a data structure for implementing a plurality of information exchange requirements each having a plurality of attributes. The data structure includes a data portion configured for storing digital data, and an attribute portion distinct from the data portion comprising a plurality of attribute fields, wherein each of the plurality of attribute fields describes an aspect of the digital data corresponding to one of the plurality of attributes associated with at least one of the plurality of information exchange requirements, to thereby implement the common schema.

20 Claims, 3 Drawing Sheets

COMMON SCHEMA FOR AGGREGATING INFORMATION EXCHANGE REQUIREMENTS

PRIORITY CLAIM

This application is a continuation of U.S. patent application Ser. No. 10/746,100 filed on Dec. 23, 2003 now U.S. Pat. No. 7,254,567, which claims priority of U.S. Provisional Application Ser. No. 60/528,686 filed on Dec. 10, 2003.

TECHNICAL FIELD

The present invention generally relates to wireless communications, and more particularly relates to systems and techniques for providing adaptive data links for wireless communications.

BACKGROUND

After the end of the Cold War and the advent of the Information Age, modern warfare strategies no longer focus on merely inflicting damage upon a particular enemy, but rather emphasize capabilities to shape behaviors of friends, foes and neutrals in peace, crisis and war settings. Whereas previous strategies generally focused upon countering defined combat threats, modern "effects based" operations provide a broad range of options for responding to a variety of challenges. Effects based operations (EBO) typically rely heavily upon the ability of combatants and strategists to rapidly share information about battlefield conditions, command intent and the like. Lethality, survivability and responsiveness are all improved through rapid information sharing and improved situation awareness, thereby resulting in increased combat power. Similar benefits may be achieved from improving system reliability in other settings, such as in the home, workplace, community or the like.

Effects-based operations benefit greatly from the ability of geographically separated entities to quickly and efficiently share information, to collaborate on tasks, and to synchronize actions in a network-centric environment. In particular, network-centric (i.e. information based) operations (NCO) benefit from flexible coordination of available resources to form dynamic, ad-hoc networks suitable for a particular mission or operation. It may be desirable, for example, for a soldier operating on a battlefield to obtain real-time photographs or other data from a satellite or aircraft passing overhead during an operation. Such timely and accurate data may greatly reduce the risks and increase the effectiveness of the soldier's operation, yet this information may not always be reliably available due to communications incompatibilities between various battlefield systems.

The Department of Defense (DoD) has attempted to improve the level of compatibility between various inter-communicating systems by promulgating standards such as information exchange requirements (IERs). Indeed, the DoD has stated in its Joint Vision 2020 ("JV2020") plan that all services and platforms operated by the DoD will globally interoperate by the year 2020. Achieving global and seamless interoperability for existing (i.e. "legacy") systems, in particular, can create difficulty as the various legacy systems are extended beyond the capabilities for which they were originally designed. The DoD has therefore set forth information exchange requirements to define the requirements for information passed electronically between and among forces, organizations, or administrative structures in the defense setting. The IERs typically define the quality (e.g. frequency, timeliness, security, etc.) and quantity (e.g. volume, speed, type, format, etc.) of data transferred between DoD systems. Compliance with information exchange requirements is mandatory for equipment for all DoD systems, and compliance with each relevant IER is verified before new equipment is added to the DoD inventory.

Difficulties arise, however, in that the IERs promulgated by the DoD are typically highly context specific, and very rigidly defined. That is, the IERs typically define a single specific type of data transfer in great inflexible detail. Each IER typically lumps link information, information assurance and application requirements parameters into a single structure. As a result, each different type of data transfer (e.g. transfers between different types of communications nodes, different types of data, different bit or frame rates, different data definitions, etc.) is typically represented by a separate IER. A single data transfer to multiple recipients, for example, typically requires a separate IER for each recipient type. If the data may be provided in multiple formats, each format typically requires its own IER, thereby multiplying the number of IER requirements by the number of supported data formats. If the transfers are allowed to take place over various channels having different data rates (e.g. P data rates), for example, each data rate typically has its own IER, again multiplying the number of IER requirements by the number of supported data rates. Consequently, true compliance with DoD specifications may require support for dozens, hundreds or even thousands of separate IERs. As additional node types, systems and capabilities are added to the DoD inventory, the number of IERs increases rapidly, and managing these IERs can present significant cost and management burdens. Moreover, the data processing resources consumed by maintaining large collections of separate IERs can be significant, thereby hindering or reducing the capabilities of the various inter-communicating components and systems.

It is therefore highly desirable to create a technique for managing the spiraling number of IERs for various components. It is also desirable to create systems and methods for aggregating the IERs into a smaller, more manageable format. Furthermore, other desirable features and characteristics of the present invention will become apparent from the subsequent detailed description and the appended claims, taken in conjunction with the accompanying drawings and this background of the invention.

BRIEF SUMMARY

According to various embodiments, a new approach to aggregating a plurality of information exchange requirements (IERs) into a common schema is disclosed. A device has a digital storage medium that includes a data structure for implementing a plurality of information exchange requirements each having a plurality of attributes. The data structure includes a data portion configured for storing digital data, and an attribute portion distinct from the data portion comprising a plurality of attribute fields, wherein each of the plurality of attribute fields describes an aspect of the digital data corresponding to one of the plurality of attributes associated with at least one of the plurality of information exchange requirements, to thereby implement the common schema.

BRIEF DESCRIPTION OF THE DRAWINGS

The present invention will hereinafter be described in conjunction with the following drawing figures, wherein like numerals denote like elements.

DETAILED DESCRIPTION

The following detailed description is exemplary in nature and is not intended to limit the invention or the application and uses of the invention. Furthermore, there is no intention to be bound by any theory presented in the preceding background of the invention or the following detailed description.

According to various exemplary embodiments, new techniques and data structures are provided that exploit the cohesion and coupling of information content between multiple IERs. Multiple IERs are aggregated into a new data schema that exploits the similarity and kinship of information in the various IERs. The new data schema can be represented by a data structure with a data field and any number of attributes fields capable of storing metadata about the data stored in the data field. The metadata can be modified as appropriate to describe the data and the communications parameters without modifying the overall data schema. The new data schema is therefore context-neutral in the sense that it focuses primarily upon data content rather than on the context of information exchange.

Figure 1:
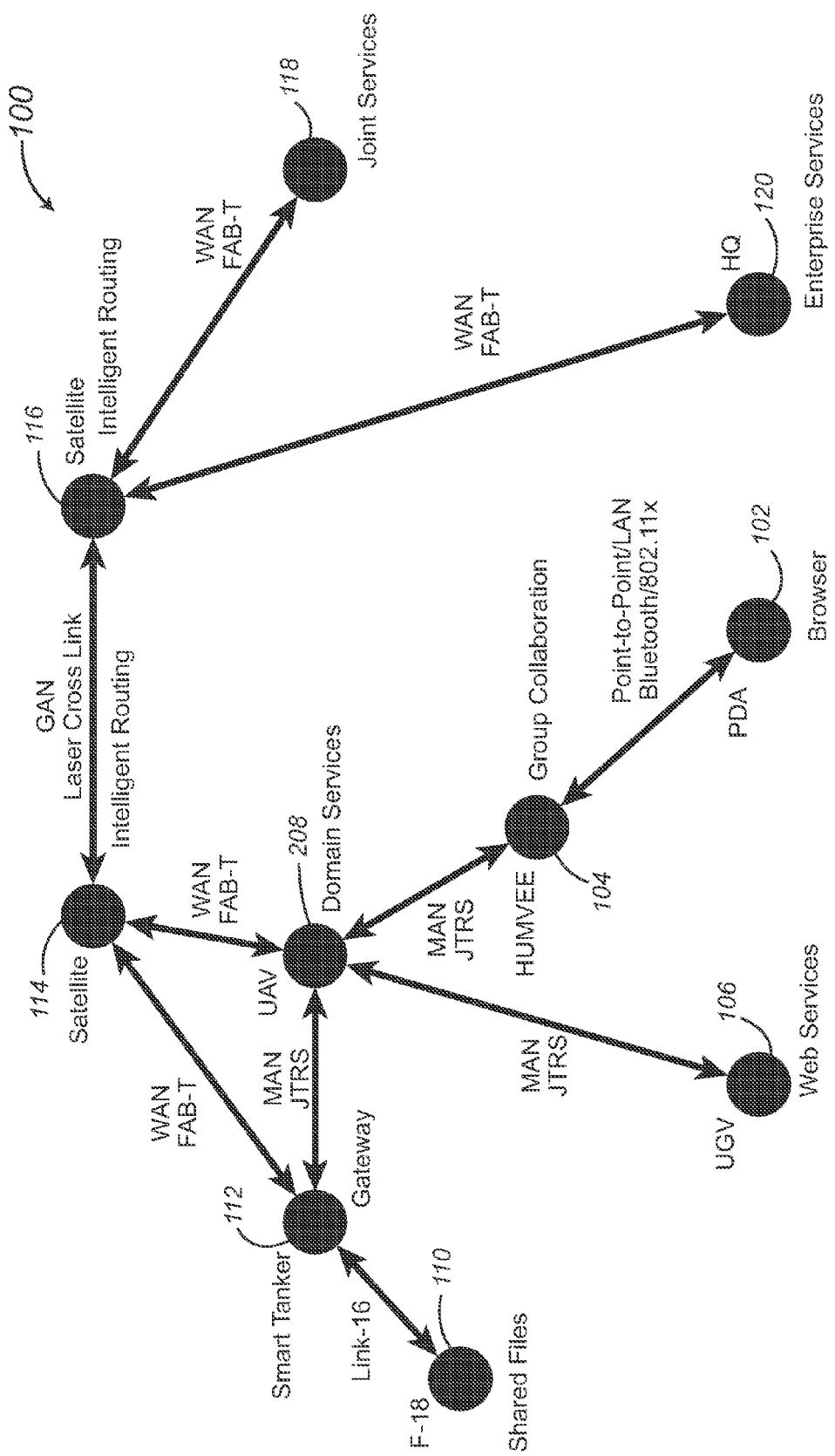
FIG. 1 is an interoperability map of an exemplary ad-hoc network based upon communication links.

Turning now to the drawing figures, an exemplary wireless communications environment 100 representing a battlefield/military scenario is shown in FIG. 1. The exemplary environment 100 shown in FIG. 1 is intended merely to illustrate the various types of devices and IERs used in a network-centric warfare environment; it is not intended to limit the scope of the invention in any way.

As shown in FIG. 1, an exemplary environment 100 suitable for use in a network centric operation includes multiple nodes forming an ad hoc networked "group-of-capability" for achieving a desired purpose. Ideally, each of the various nodes are allowed to inter-communicate via voice, data, video or the like even when the nodes have widely varying processing and communication capabilities. This interoperability between different types of nodes allows the formation of ad hoc networks to execute a particular task or tasks, as appropriate. In the example shown in FIG. 1, two or more satellite nodes 114, 116 are designed to communicate with ground and air-based nodes using FAB-T or other wireless links to implement a wide area network (WAN). Satellites 114, 116 suitably interlink ground-based nodes (e.g. headquarters node 120) and airborne nodes such as a joint services command node 118, gateway node 112 (shown residing in a smart tanker or other aircraft) and domain services node 108 (shown residing in an unmanned aerial vehicle (UAV)). Satellites 114, 116 may also provide an intelligent routing function to route digital information between the various nodes communicating within environment 100. Each type of data exchange is typically defined by an IER; that is, a separate IER is typically provided for every message format transmitted within environment 100. To that end, literally hundreds or thousands of IERs may be supported within environment 100 as each node communicates with various other nodes to transfer multiple types of data in various formats.

An illustrative example will demonstrate the benefits of integrating the various IERs used for data communications into a common schema. With continued reference to FIG. 1, a mission commander on an airborne command and control aircraft (e.g. an Air Force MC2A aircraft) may become aware of a time-critical target to be engaged with existing assets that are currently on other missions. As resources in the area have "reported in" to a common domain registry 108 with information regarding their identity, mission capability, current mission assignment, location and/or the like, the commander is appropriately made aware of each node's location, its capability, and its current mission assignment. In the exemplary embodiment of FIG. 1, domain services node 108 is shown in an unmanned aerial vehicle (UAV) in communication with at least one vehicle node 104, an unmanned ground vehicle (UGV) node 106 and a gateway node 112 on a refueling aircraft via a joint tactical radio system (JTRS) or other appropriate communications link. Each "reporting message" provided to the domain services node 108 typically has a corresponding IER, so the domain services node must typically support each of these various IERs received from each node attempting to report in. Moreover, each message path typically has its own set of IERs, further increasing the number of IERs supported by both domain services node 108 and by each node communicating with domain services node 108.

To continue with the example, a decision aid tool available to the commander on airborne command node 118 may interoperate with domain services node 108 to suggest that an Army unit with a UGV be tasked to engage the nearby target based upon the UGV's location and capabilities. The UGV may be controlled by a soldier having a personal digital assistant (PDA) node 102 that is used to remotely control UGV node 106 as appropriate, and that communicates with a group collaboration node 104 residing in a vehicle or other appropriate location. PDA node 102 may also obtain additional data from sensors attached to UGV node 106. Again, each type of data received typically has its own set of IERs; if data is transmitted or received in multiple formats or across different data links, each format and link typically includes its own set of IERs as well. Image data, for example, may be transferred from a web-type server applet executing on UGV node 106 to a browser application executing on PDA 102 using domain services node 108 to transfer the data as appropriate. This relatively straightforward data transfer typically requires that the PDA and UGV node 106 support specific IERs for the image transfer, with each recipient type, data link type, image type, image resolution and data classification (e.g. unclassified, secret, etc.) typically requiring both PDA 102 and domain services node 108 to maintain a unique IER for those particular parameters.

If information received from command node 118 fails to match sensor data from UGV node 106, the soldier may wish to obtain additional information before engaging the target. The speed at which this information becomes available to the soldier may be very important, since the target may be mobile and may pose a threat to civilians, forces friendly to the soldier, or others during the intervening time. Accordingly, software on PDA node 102 has additional sets of IERs to access a list of resources available in the area from domain services node 108 and to subscribe to data and/or services provided by appropriate resources. The service directory provided by domain services node 208 suitably functions as a "yellow pages" type service whereby nodes in the domain can advertise their resources and capabilities. In this example, the service directory identifies an aircraft node 110 (e.g. a Navy F-18 or the like) in the area on a separate mission, but having the capability to provide aerial photographs. If the aircraft node 110 is not capable of communicating on a TCP/IP or other appropriate network interconnecting the various nodes in environment 100, a gateway node 112 may be provided to transfer data communications from environment 100 to the aircraft node 110. A gateway node 112 may be provided on a refueling aircraft, for example, of from any other convenient source, to act as a proxy for node 110 operating in environment 100. In the exemplary embodiment shown in FIG. 1, aircraft node 110 is capable of communicating via a LINK-16 network to gateway node 112, which appropriately converts data from the LINK-16 format to TCP/IP or other protocols that can be transferred within environment 100. Each of these various data transfers, however, typically has its own unique set of IERs for data senders and recipients.

After environment 100 identifies a source of data for PDA node 102, a request to fuse the new data from aircraft node 110 and UGV node 106 may be provided to a data fusion service provided by command and control node 118, for example, or by any other source. The fused data may then be provided to PDA node 102 (using yet another set of IERs) to verify the target's identity and/or location, and may also be provided to UGV node 106 to improve its ability to locate the target. Environment 100 may also support wireless voice communications between a commander at aircraft 118, a unit leader at vehicle 104, soldier 102 and a pilot or navigator in aircraft 110 to further provide information relevant to the mission.

While the above example is illustrative in nature, the importance and value of the various wireless voice and data links can be readily appreciated, as can the administrative burden of the large number of IERs used to complete the scenario. In the case of the soldier's PDA 102, for example, this portable device maintains separate sets of interface exchange requirements for registration messages, data queries, image transfers, communication with UGV 106, communication with workgroup 104, and virtually every other communications function provided by the device. These IERs can present significant processing inefficiencies; it is therefore highly beneficial to aggregate some or all of the loosely related IERs into a common data schema that can be readily and efficiently managed. Similar benefits could be realized at each of the other nodes communicating within environment 100 as well.

Figure 2:
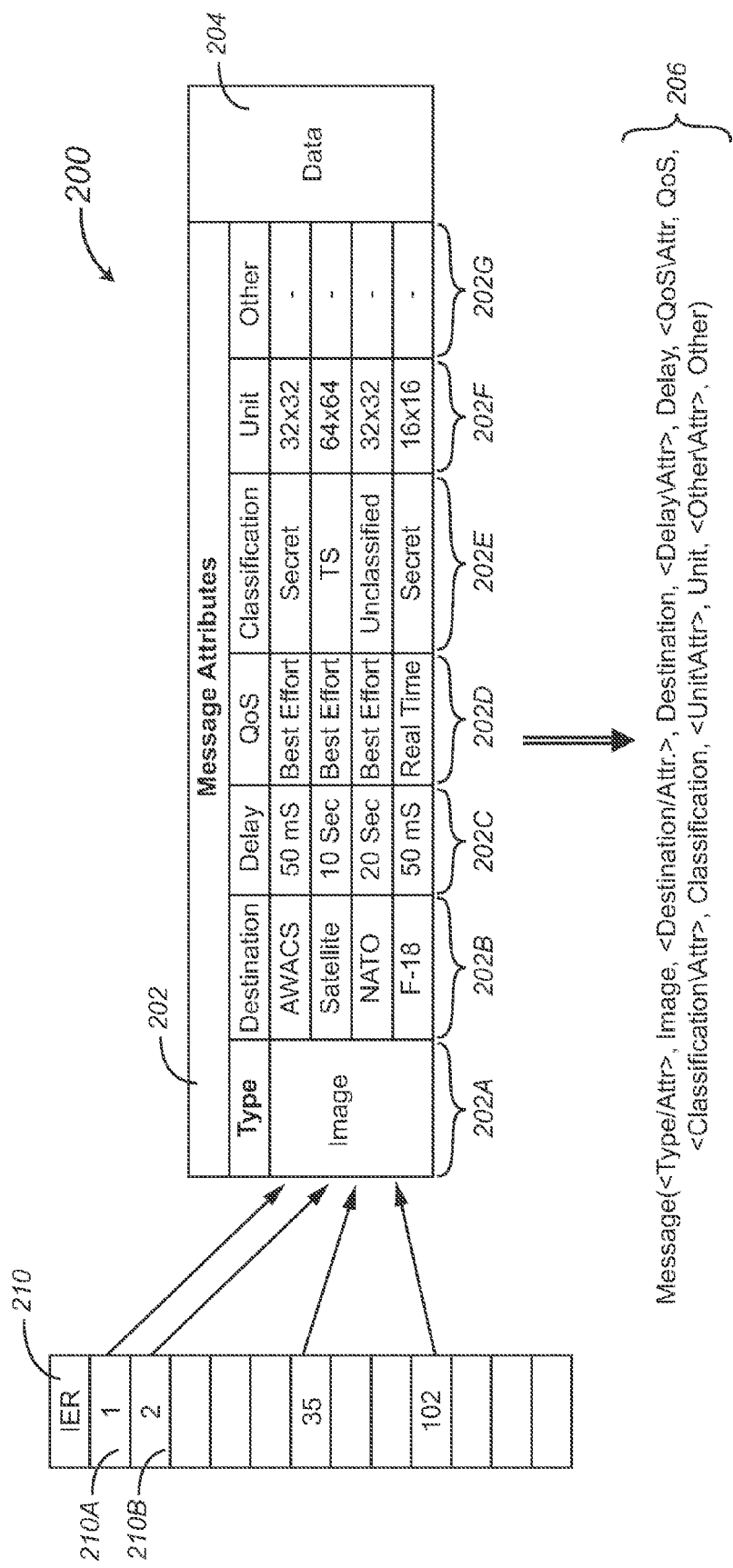
FIG. 2 is a conceptual diagram of an exemplary adaptive Information Exchange Requirements aggregation technique.

Referring now to FIG. 2, an exemplary data schema 200 for representing multiple IERs 210 suitably includes a data field 204 for storing digital data content in addition to a number of attributes fields 202 for storing metadata about the content stored in data field 204. Data schema 200 is designed to be context-neutral; that is, it focuses on the content of the data itself rather than on the context-sensitive factors such as mission, information classification, quality of service (QoS) and other context-sensitive factors. Rather than requiring a separate IER for each distinct context, data schema 200 allows for intelligence to be built into the structure, thereby reducing duplication and improving flexibility. As a result, nodes are no longer required to store and maintain long lists 210 of IERs, but rather can represent the information contained in multiple IERs within a single coherent structure. In this sense, data schema 200 is similar to a relational database structure that maintains metadata attributes of stored content.

Data field 204 is any format capable of storing digital content provided as message data during communication. Message data may include image data, ASCII or other text, binary code, audiovisual data (e.g. voice or video) or any other type of digital data. For digital image data, for example, data field 204 stores the image in any appropriate format and resolution, without regard for the recipient of the data.

Attribute fields 210 are any data fields or other structures capable of holding metadata describing the digital content stored in data field 204. Each schema 200 may include any number of attribute fields. In the example shown in FIG. 2, for example, schema 200 includes separate attribute fields for data type 202A, data destination 202B, transmit/receive delay times 202C, quality of service (QoS) 202D, data classification 202E, data resolution 202F, as well as other fields 202G as appropriate. Each of these fields describes characteristics of content stored in data field 204. Data type field 202A, for example, maintains an indication of the type of data stored (e.g. "image"). Other fields maintain indications of delay times 202C, QoS 202D, classification 202E and other parameters associated with transmitting data 204 to various recipient types 202B. Because the attributes fields 210 are populated with metadata about the content 204 itself, the context of data transmission is less important than the content of the data itself.

Schema 200 is shown organized in an ordered format, with various commonalities (e.g. all IER records for image data) grouped together. Pattern commonalities can be further exploited to analyze common characteristics in the information content between multiple IERs. In this manner, the various data contained in multiple IERs can be organized into a coherent structure 200 that reduces the amount of memory, mass storage, etc. used to maintain IER list 210. Moreover, the new schema 200 is created to be context-neutral and to define the content of data 204 in an organized manner to emphasize the characteristics of the data, thereby allowing for easy and methodical interpretation. Further, the commonality in patterns and context neutrality enables schema 200 to be reused by many consumers on multiple platforms, thereby reducing the number of IERs needed to assure interoperability.

Schema 200 may be readily represented by a data structure 206 in any appropriate computing language such as extensible markup language (XML), United States message text format (USMTF), variable message format (VMF) or the like. As a result, a common data structure with attribute data from attribute fields 210 can be used to replace a large number of separate IER data structures previously required. This single data structure is capable of supporting numerous types and formats of data 104 across a wide range of communication contexts by simply adjusting the metadata values stored in the various attribute fields 210. Moreover, as various attributes of data 204 change, the data structure 206 and/or schema 200 need not be themselves modified; the attribute fields 202 in data structure 206 thereby allow flexibility not found in convention lists of IERs 210.

The data schema 200 and data structure 206 shown in FIG. 2 are exemplary in nature, and are not intended as limiting. To that end, data structure 206 may be greatly expanded with alternate and/or additional attribute fields 202, and with many more IER records for any number of data types 202A. Schema 200 could be readily expanded beyond image data, for example, to include text messaging, voice data, video or other types of content. Similarly, the other attributes 202 could be readily expanded such that scheme 200 represents a large number of IERs representing, for example, many of the various message types transmitted between nodes operating within environment 100 or the like.

Figure 3:
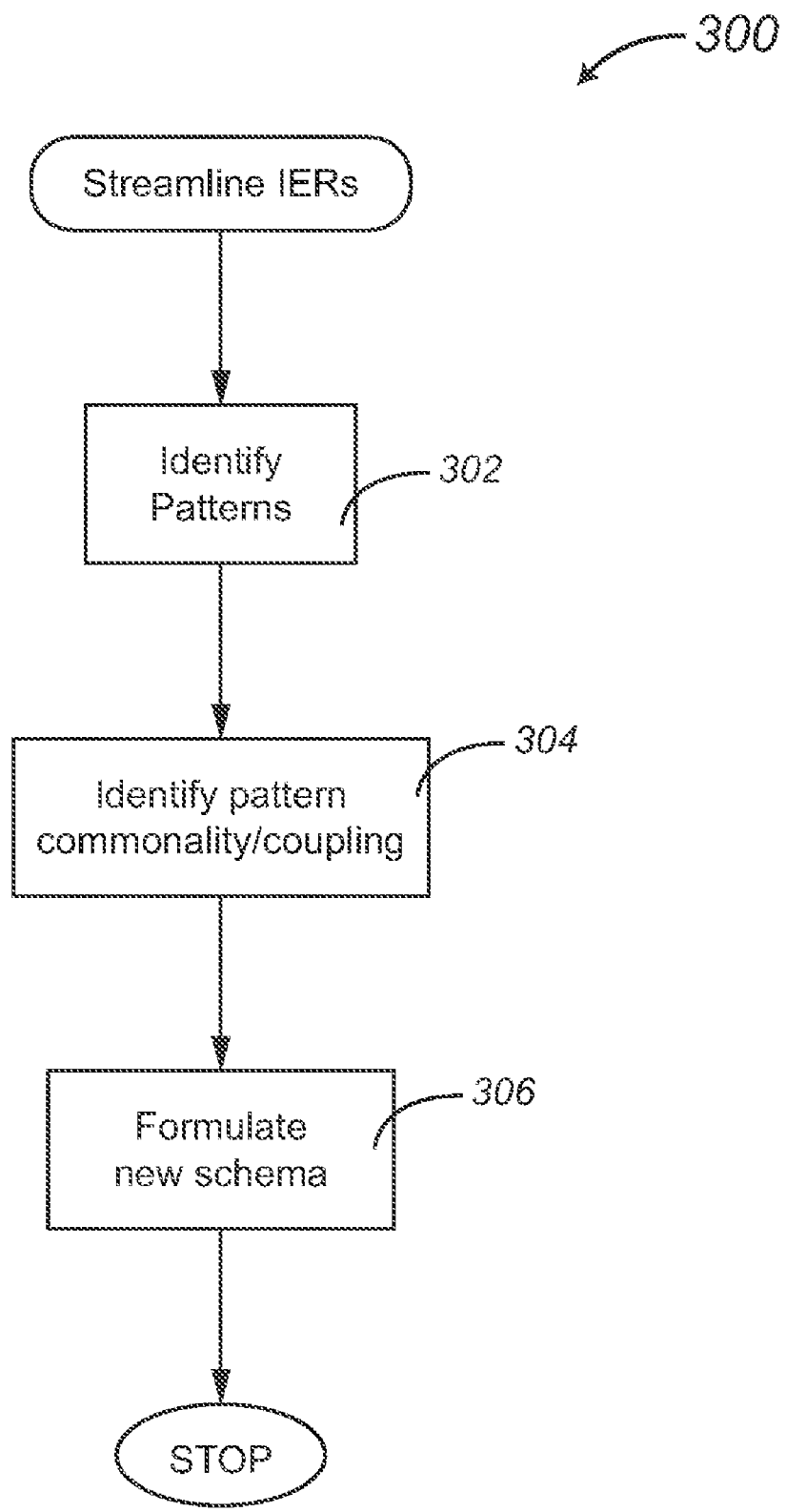
FIG. 3 is a flowchart of an exemplary process for implementing adaptive wireless communication.

With reference now to FIG. 3, an exemplary process 300 for aggregating multiple information exchange requirements suitably includes the broad steps of tabulating the IER list in an ordered format (step 302), identifying patterns of commonality and coupling within the ordered format (step 304), and forming a new schema based upon the patterns of commonality identified (step 306). The various steps described in FIG. 3 are exemplary, and may be modified or omitted in alternate embodiments. Additionally, process 300 may be executed manually by a human operator or may be automated using conventional data processing techniques in a wide array of alternate embodiments.

The process 300 of streamlining a list of IERs 210 (FIG. 2) suitably begins by tabulating the IERs 210 in an ordered format (step 302) based upon pattern commonality and coupling between the various IERs. The ordered format may be arranged in any order using conventional data sorting techniques. In the exemplary schema shown in FIG. 2, for example, the various IER records 210 are arranged such that IERs for various data types (e.g. image, video) are placed together. In this sense, "data type" may be considered similar to a "key field" used to organize a conventional relational or object-oriented database, with various other attributes optionally arranged in ordered sub-fields for additional order.

After the IERs are arranged in an ordered format, patters of commonality between IERs can be analyzed (step 304) to further identify common characteristics of the information content between different IERs. These patterns of commonality include common data attributes or common characteristics of the data that are shared between various IERs, and the like.

Based upon common patterns observed across multiple IERs, a new schema 200 for representing the data sets are then formulated (step 306). This schema 200 can be readily represented by a data structure 206 as described more fully above. This data structure 206 appropriately contains attribute fields 202 based upon the content of data 204 rather than the context of the data communication, thereby facilitating reuse across a wide array of communications contexts. As referenced above, the new schema 200 created is appropriately designed to be context neutral and to define the data in an organized manner to emphasize the characteristics of the data, thereby allowing for easy and methodical interpretation. Further, the schema 200 can be shared across multiple platforms, as described above. The commonality in patterns and context neutrality of schema 200 enables data to be reused and promotes interoperability, thereby reducing the number of IERs needed to insure interoperability within a particular environment 100.

While at least one exemplary embodiment has been presented in the foregoing detailed description, it should be appreciated that a vast number of variations exist. Although various aspects of the invention are frequently described in conjunction with a battlefield setting, for example, the various techniques and systems described herein could be readily implemented in other contexts, including emergency services, corporate, commercial or private voice, data or multimedia communications, or any other environment. It should also be appreciated that the exemplary embodiment or exemplary embodiments are only examples, and are not intended to limit the scope, applicability, or configuration of the invention in any way. The foregoing detailed description will provide those skilled in the art with a convenient road map for implementing the exemplary embodiment or exemplary embodiments. Various changes can be made in the function and arrangement of elements without departing from the scope of the invention as set forth in the appended claims and their legal equivalents. The various steps of the methods, processes and techniques described in the appended claims, for example, could be practiced in any temporal order, for example, or may be practiced simultaneously in various equivalent embodiments.

What is claimed is:

1. A digital storage medium having computer-interpretable data stored thereon, wherein the computer-interpretable data comprises a data structure for implementing a plurality of information exchange requirements for transmitting a digital message between a plurality of nodes, the data structure comprising:

a data portion configured for storing the digital message; and an attribute portion distinct from the data portion comprising a plurality of attribute fields representing a plurality of attributes of the digital message, wherein each of the plurality of attribute fields also implements a requirement of at least one of the plurality of information exchange requirements associated with the digital message, wherein the plurality of information exchange requirements comprise a plurality of standards for a communication compatibility between the plurality of nodes;

wherein the data structure implements the plurality of information exchange requirements in a single schema.

2. The digital storage medium of claim 1 wherein each of the plurality of attribute fields corresponds to a common characteristic in at least two of the plurality of information exchange requirements.

3. The digital storage medium of claim 1 wherein each of the plurality of attribute fields are modifiable without modifying the single schema.

4. The digital storage medium of claim 1, wherein the single schema is independent of a data transfer type.

5. The digital storage medium of claim 1 wherein the single schema comprises extensible markup language (XML) code.

6. The digital storage medium of claim 1 wherein the single schema is implemented using United States message text format (USMTF).

7. The digital storage medium of claim 1 wherein the single schema is implemented using variable message format (VMF).

8. The digital storage medium of claim 1 wherein the plurality of attribute fields comprises a message type field, and wherein the plurality of attributes of the digital message are grouped by a value in the message type field.

9. The digital storage medium of claim 1 wherein the plurality of attribute fields comprises a destination field.

10. The digital storage medium of claim 1 wherein the plurality of attribute fields comprises a data classification field.

11. The digital storage medium of claim 1 wherein the information exchange requirements define a requirement of the digital message selected from a data frequency, a data timeliness, and a data security.

12. A device comprising a digital storage medium with a data structure stored thereon for implementing a plurality of information exchange requirements for transmitting a digital message between a plurality of nodes, the data structure comprising:

a data portion configured for storing the digital message; and an attribute portion distinct from the data portion comprising a plurality of attribute fields representing a plurality of attributes of the digital message, wherein each of the plurality of attribute fields also implements a requirement of at least one of the plurality of information exchange requirements associated with the digital message, wherein the plurality of information exchange requirements comprise a plurality of standards for a communication compatibility between the plurality of nodes;

wherein the data structure implements the plurality of information exchange requirements in a single schema.

13. The device of claim 12 wherein each of the plurality of attribute fields corresponds to a common characteristic in at least two of the plurality of information exchange requirements.

14. The device of claim 13 wherein the single schema is independent of a data transfer type.

15. The device of claim 14 wherein the each of the plurality of attributes fields is based on a content of the digital message.

16. The device of claim 15, wherein the single schema is grouped and ordered by a data type of the digital message.

17. The device of claim 16 further comprising means for formatting a communications message provided to the second device, wherein the message comprises a portion of the digital message and is formatted in compliance with the one of the information exchange requirements.

18. The device of claim 17 wherein the message is formatted in compliance with the one of the information exchange requirements based upon attributes stored within the single schema.

19. A collaborative communications system comprising a plurality of nodes, wherein each node is configured to communicate with at least one of the other nodes using one of a plurality of information exchange requirements for transmitting a digital message, and wherein at least one of the plurality of nodes comprises a digital storage medium with a data structure stored thereon for implementing each of the plurality of information exchange requirements used by the at least one of the plurality of nodes, and wherein the data structure comprises:

a data portion configured to store the digital message; and an attribute portion distinct from the data portion comprising a plurality of attribute fields representing a plurality of attributes of the digital message, wherein each of the plurality of attribute fields also implements a requirement of at least one of the plurality of information exchange requirements associated with the digital message, wherein the plurality of information exchange requirements comprise a plurality of standards for a communication compatibility between the plurality of nodes;

wherein the data structure implements the plurality of information exchange requirements used by the at least one of the plurality of nodes in a single schema.

20. The system of claim 19 wherein messages from the at least one of the plurality of nodes to each of the at least one of the plurality of other nodes are formatted in compliance with one of the information exchange requirements based upon attributes in the plurality of attributes stored within the single schema.

* * * * *